INVENTOR.
MASATOSHI SHIMADA

BY [signature]

AGENT

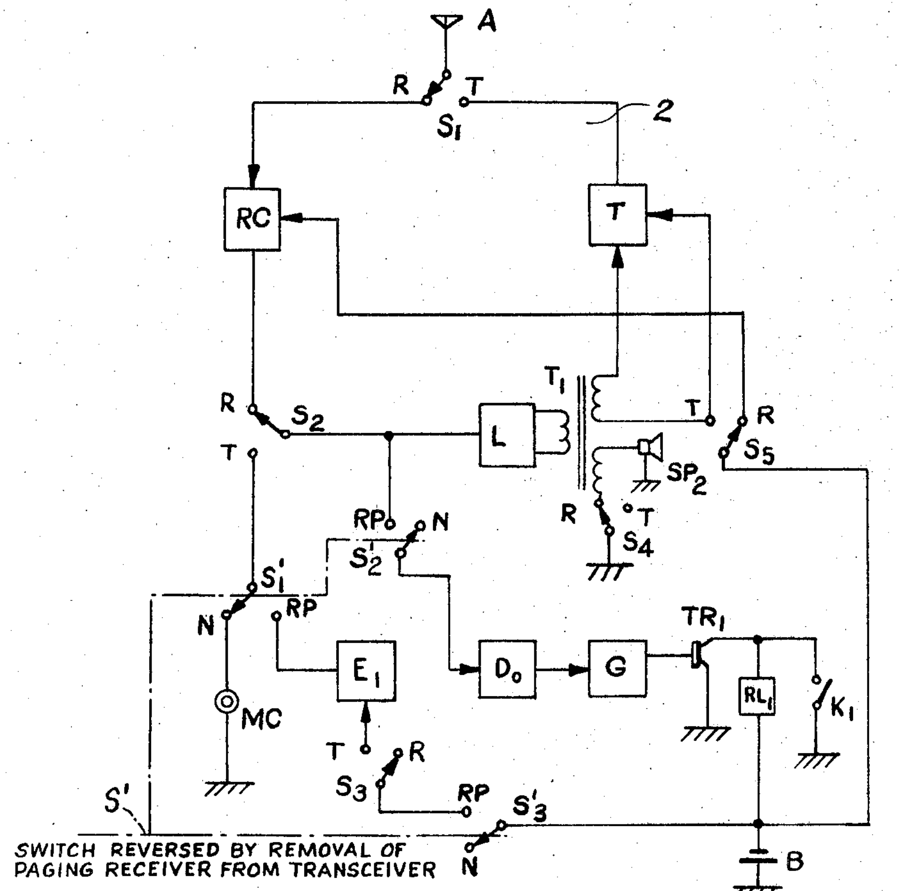
FIG.3
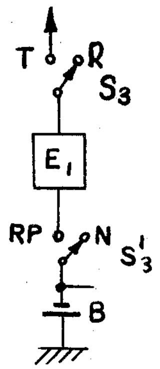
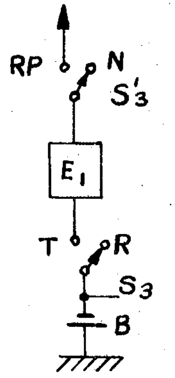
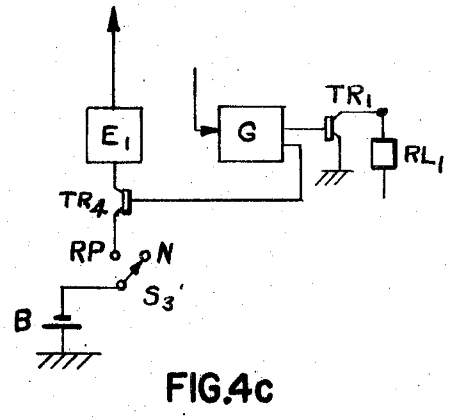
FIG.4A FIG.4B FIG.4C
INVENTOR.
MASATOSHI SHIMADA
BY [signature]
AGENT

PAGING CALL RELAY STATION USING RADIO TRANSCEIVER

Filed Sept. 29, 1966

INVENTOR.
MASATOSHI SHIMADA
BY [signature]
AGENT

INVENTOR.
MASATOSHI SHIMADA
BY [signature]
AGENT

PAGING CALL RELAY STATION USING RADIO TRANSCEIVER

Filed Sept. 29, 1966 5 Sheets-Sheet 5

INVENTOR.
MASATOSHI SHIMADA
BY [signature]
AGENT

United States Patent Office 3,513,397
Patented May 19, 1970

3,513,397

PAGING CALL RELAY STATION USING RADIO TRANSCEIVER

Masatoshi Shimada, 78 2-chome, Todoroki, Tamagawa, Setagaya-ku, Tokyo, Japan

Filed Sept. 29, 1966, Ser. No. 582,811
Claims priority, application Japan, Oct. 6, 1965, 40/60,784; Mar. 1, 1966, 41/12,001; Apr. 5, 1966, 41/20,975
Int. Cl. H04b 7/14
U.S. Cl. 325—6 11 Claims

ABSTRACT OF THE DISCLOSURE

A radiocommunication system wherein a transceiver, provided with a switchover relay for changing from a normal receiveing condition to a transmitting condition, includes a decoder which responds to an incoming call signal for actuating the switchover relay after a delay sufficient to allow complete reception of the call signal and for operating an encoder to retransmit the call signal to a paging receiver.

This invention relates to a radio transceiver and more particularly to a radio transceiver adapted to be used as a repeater for a calling signal to call up a pocket-radio paging receiver.

If a vehicle is equipped with a C.B. (citizen band) radio transceiver, as long as the operator is in his vehicle and within the C.B. range he can be called on the transceiver, but when he leaves his vehicle he is out of range.

This inconvenience will be overcome by providing a radio signaling transmitter along with a selective calling system to the radio transceiver and by the operator carrying a pocket radio paging receiver with him when he leaves his vehicle. Thus, when a radio transceiver receives a calling signal from a radio signaling transmitter, the transceiver operates to transmit a wave modulated by a special tone signal whereby the paging receiver is selectively called up.

This invention is intended to utilize the radio transceiver as a signaling repeater by a switchover operation when needed, and to relay the special radio signal.

In a conventional radio transceiver system which is designed to use the same frequency and the same antenna in common by means of a reversing switch in response to reception and transmission, it is impossible to operate the transmitter and receiver at the same time. Therefore, it cannot be utilized as a signal repeater. Accordingly, this invention is characterized by employing a control circuit with a delay action by which this difficulty is overcome and whereby the usual radio transceiver can be used as a repeater of a calling signal to a pocket-radio paging receiver.

Another feature of the invention is the use, with the radio transceiver, of an encoder to which a decoder of the paging receiver is responsive.

Thus, when the radio transceiver receives a predetermined first signal, the control circuit is enabled and the radio transceiver is automatically changed from a receiver to a transmitter. It then operates to transmit a wave modulated by a predetermined second signal for a given period after the termination of said first signal. A radio paging receiver, which is tuned to the wave and is equipped with a decoder and other devices described hereinafter, is now selectively called up.

In a radio communication system wherein the same frequency is employed for both transmission and reception, as in a citizen-band radio transceiver, if a decoder is employed in the receiver which provides an output in response to the reception of a given calling signal, such an arrangement effectively functions as an ideal squelch system since random noise, undesired speech signals and the like are completely eliminated in the reception.

Therefore, in order to convert a citizen-band transceiver with a selective calling system into a repeater of this calling signal, it is necessary to add a control circuit to the transceiver and an encoder for the paging receiver. Moreover, if a press-to-talk or switchover relay is provided, an additional relay is not needed since the control circuit can control the switchover relay.

Therefore, an object of this invention is to provide a radio transceiver which can be used as a calling-signal repeater for calling up an associated paging receiver.

It is a further object of the invention to provide a paging receiver which is relatively simple, of small size and relatively inexpensive, by gripping it with an amplitude-modulation system regardless of the modulation system of the transceiver.

It is a further object of the invention to eliminate cross-calling from another fixed transmitter with a relatively large power output by changing the transmitting frequency when the transceiver is utilized as a repeater of the calling signal.

For a better understanding of the invention, together with other and further objects thereof, reference is had to the following description taken in conjunction with the accompanying drawing in which like parts are designated by like numerals of reference throughout the several views and in which:

FIG. 3 is a block diagram of an embodiment of the invention in which switching means are shown in detail;

FIGS. 4A through 4E are schematic diagrams of examples of switching means;

Figure 1:
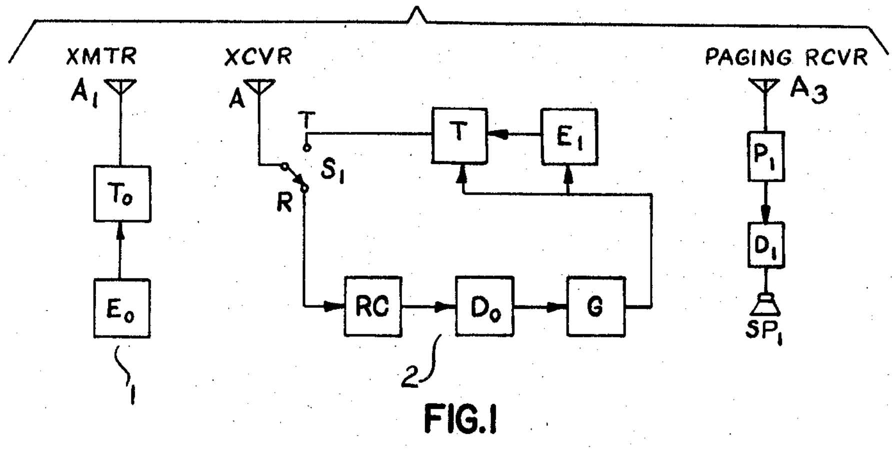
FIG. 1 is a block diagram of a transceiver constructed in accordance with the principles of the invention.

In FIG. 1, which is a block diagram of the fundamental configuration of a transceiver according to the invention, there are shown a transceiver station 1, a transceiver station 2, and a radio paging receiver 3.

The transceiver station 1 comprises an antenna $A_1$, a transmitter $T_0$ and an encoder $E_0$. The conventional receiver and press-to-talk switches for regular communication are not shown since they are not needed for an understanding of the operation of this invention. The transceiver station 2 comprises an antenna A which is utilized in common for reception and transmission, a reversing switch $S_1$ which is controlled by a control circuit G a receiver RC a signal decoder $D_0$ a transmitter T and its encoder $E_1$. The radio paging receiver 3 comprises an antenna $A_3$, a receiver $P_1$, a decoder $D_1$ correlated with encoder $E_1$ in the transceiver 2, and a loudspeaker $SP_1$.

If the transceiver station 1 transmits a wave modulated by the Encoder $E_0$, the receiver RC of the transceiver 2 its waiting state triggers the decoder, $D_0$ which provides an output to control the circuit G in response to the signal from encoder $E_0$. The control circuit G is enabled by the output from decoder $D_0$, to trip a press-to-talk relay (not shown in this figure) whereby the transmitter T and encoder $E_1$ become operative and the armature $S_1$ of said relay is shifted into its other position T. The output of transceiver T is then connected to the antenna A. The control circuit G functions to operate after a short delay following the application of the output from decoder $D_0$ and maintains its operative condition for a desired period during which the paging receiver 3 is called up. It then ceases its operative condition automatically after said period. The paging receiver 3, having a decoder $D_1$, will selectively respond. The encoder $E_1$ can be a conventional calling oscillator if there is no problem of miscalling. Furthermore, an electronic switching device may be utilized as the control circuit G in place of the relay whose function is to render the transmitter T and the decoder $E_1$ operative. The antenna A does not necessarily have to be common but independent antennas can be used for transmitter T and receiver E, respectively. The encoder $E_1$ may be of comparatively simple type so as to simplify the paging receiver.

The decoder $D_0$ may be, for example, a vibrating-reed selector, a ceramic filter, a bandpass filter, a resonant circuit, a pulse-code decoder, a group-signal decoder, a sequential-signal decoder, or a device in which several of the foregoing elements are combined.

Figures 2, 10:
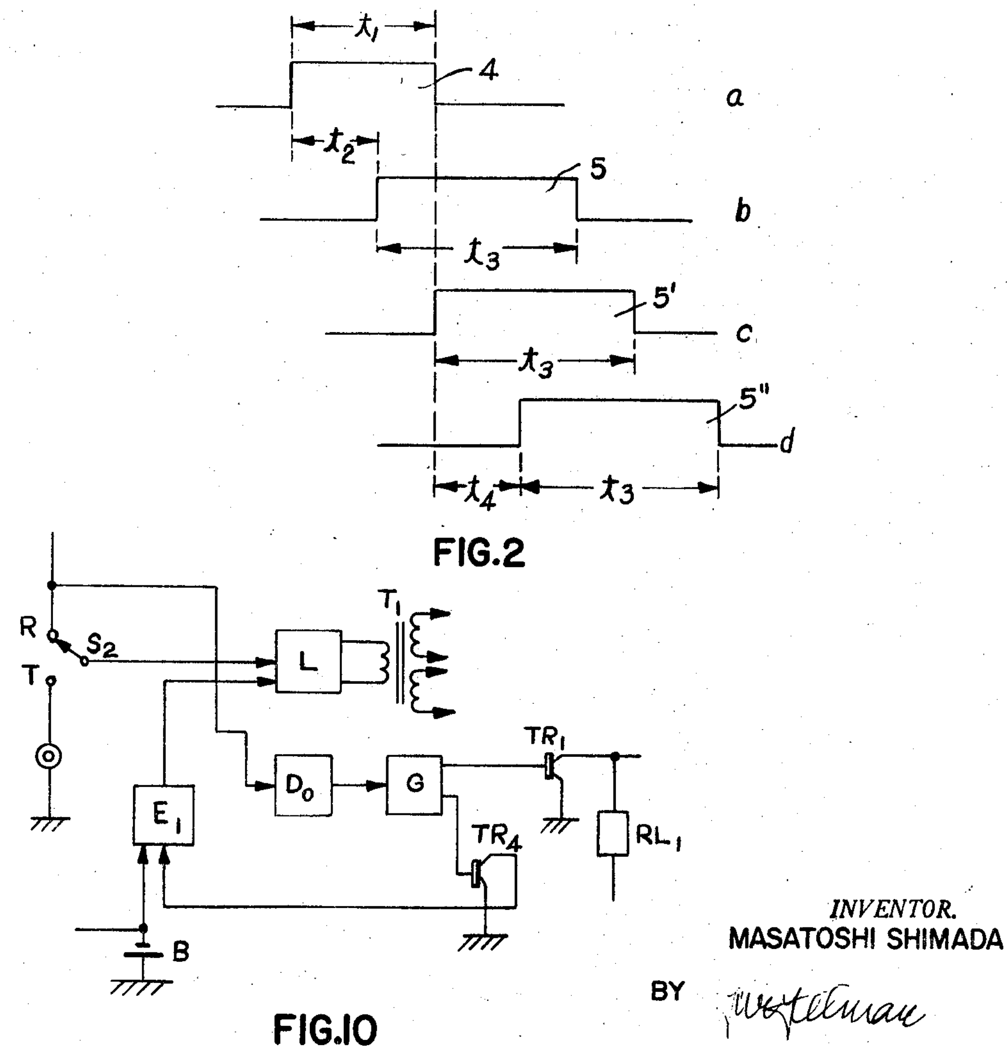
FIG. 2 is a time diagram of the received and transmitted signals.
FIGS. 8, 9 and 10 are modifications of the circuit shown in FIG. 7.

FIG. 2 is a time diagram illustrating the operation of the system of FIG. 1.

A calling signal 4 as shown in graph 2 is transmitted from the transmitter $T_0$ of a transceiver station 1 for a period $t_1$. The control circuit G in transceiver 2 then begins to operate after a delay time $t_2$ and maintains its operative condition for a desired period $t_3$ as shown at 5 in graph *b*. This time is necessary to call up the paging receiver 3.

There are shown other examples of delay time in graphs *c* and *d*. In 2*c* the control circuit G begins to operate for a period 5' of duration $t_3$ as soon as the calling signal 4 is terminated. In graph *d* a delay time $t_4$, measured from the termination of the calling signal 4, intervenes before the operating period 5. All the delays are generated by circuit arrangements which are described hereinafter.

The delay time $t_2$ should be determined in consideration of the stability of the control system, having regard to such transistory conditions as the chattering of contacts. Also to be considered are the build-up time of the control circuit G, the receiving energy required by the control circuit G and the need for eliminating spurious operation by noises and the like.

The transceiver 2 can be made operative as an ordinary transceiver by switching means, which are shown in detail in the latter figure. In FIG. 3 $S_1$, $S_2$, $S_3$, $S_4$, and $S_5$ are the armature of the press-to-talk relay $RL_1$, which is tripped by a press-to-talk button $K_1$. The drawing shows the normal receiving position R and the functions of these armatures need not be described in detail. Also, other detailed connections from a power source B are not shown in the drawing since they are not needed for an understanding of the operation of the invention and are well known to those skilled in the art. $S'_1$, $S'_2$, $S'_3$ are armatures of a multiple switch S' by which the transceiver 2 is converted into a signal repeater. The drawing shows the "normal transceiver" switching position N in which a microphone MC is connected to a coupling circuit, comprising a hybrid-coil transformer $T_1$, via a low-frequency amplifier L whenever pushbutton $K_1$ is pressed to actuate the switchover relay $RL_1$; an associated loudspeaker, shown at $SP_2$, is connected in circuit by relay armature $S_4$ in receiving position R in which armature $S_2$ transmits the output of receiver RC to amplifier L.

When the multiple switch S' is thrown into the position "repeater" RP, the system is the same as that shown in FIG. 1. When the receiver RC then receives a signal from the calling transmitter $T_0$, the decoder $D_0$ connected in parallel with amplifier L triggers to the control circuit G which in turn provides an output to control a transistor $TR_1$, thus energizing the relay winding $RL_1$. The armatures $S_1$, $S_2$, $S_3$, $S_4$ and $S_5$ are then moved into their transmitting position T. Thus the power source B is connected to the encoder $E_1$ through the armatures $S'_3$–$S_3$, and the output signal of encoder $E_1$ is applied to the common amplifier L through armatures $S'_1$–$S_2$ to modulate the transmitter $T_1$. This modulated output may be radiated from the antenna A to call up the paging receiver 3.

A transceiver set as described above can be designed to hold a paging-receiver set in the transceiver unit during normal transceiver operation. The paging receiver set is then pulled out from the transceiver set and carried with the operator during repeater usage. Provision is made for automatically shifting the multiple switch S' into its repeater position RP when the paging-receiver set is pulled out.

Figure 4D:
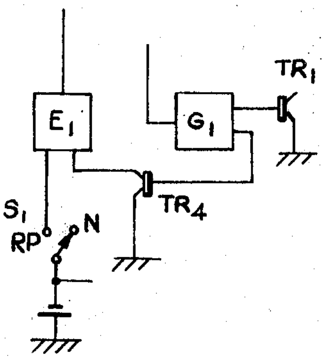

Several circuit arrangements for the armature $S'_3$ of FIG. 3, which renders the encoder $E_1$ operative, are shown in FIG. 4. FIGS. 4A and 4B obviously are equivalents of the circuit shown in FIG. 3. An electronic switching arrangement as shown in FIGS. 4C and 4D replaces the armature $S_3$ of FIG. 4A. The switching transistor $TR_4$, which places the encoder $E_1$ in an operational mode, is controlled by the output of the control circuit G. The function of the switch in FIG. 4D is the same as in FIG. 4C, with substitution of circuits $E_1$ and $G_1$ for components E and G.

Figure 4E:
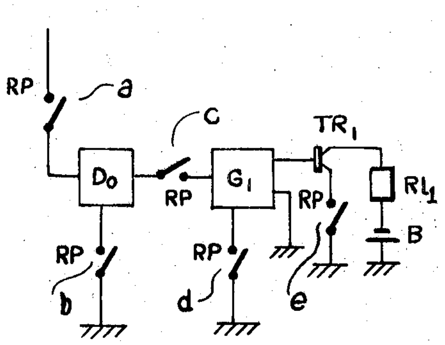

The circuit breaker $S'_2$ of FIG. 3 can also be used in several positions of the circuit, e.g. as shown at *a, b, c, d, e* in FIG. 4E. In each case its function is to render the control circuit $G_1$ operable to activate the relay $RL_1$, when the receiver RC has received a calling signal.

Figure 5:
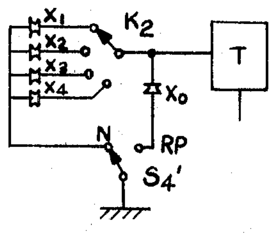
FIG. 5 is a schematic diagram of an example of a circuit suitable for use as a selector of transmitting frequency.

If the receiving frequency of the paging receiver $P_1$ is the same as the transmitting frequency of transceiver 2, it may happen at times that the paging receiver is called up by another transceiver station which is located within a close range or has a relatively large power output. FIG. 5 is a schematic diagram of an embodiment of the invention which can avoid such miscalling by changing the transmitting frequency when transceiver 2 is utilized as a calling repeater. A frequency-selector switch $K_2$ with bank contacts connected to frequency sources $X_1$, $X_2$, $X_3$, $X_4$ as shown in FIG. 5. Other circuitry has been omitted since it is the same as that of FIG. 3. A contact $S'_4$ is a part of the multiple switch S' and allows a predetermined transmitting frequency $X_0$ to be selected in its repeater position RP.

Figure 6:
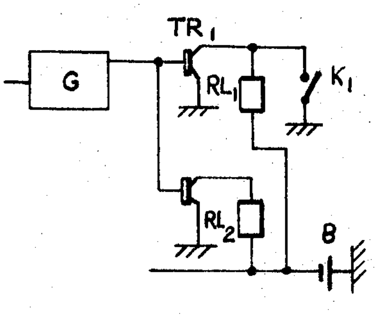
FIG. 6 is a schematic diagram of an example of a circuit suitable for use as a control circuit for the second relay.

If a frequency-modulation system or a single-sideband system is utilized in the transceiver, the paging receiver becomes large in size and expensive. A schematic diagram of an embodiment of the invention which can eliminate such a disadvantage is shown in FIG. 6, comprising control circuit G with associated transistors $TR_1$, $TR_2$ and relays $RL_1$, $RL_2$. Other elements are not shown since they are the same as in FIG. 3.

When the decoder $D_0$ operates, the control circuit G also provides an output by which the transistors $TR_1$ and $TR_2$ become conductive and the relays $RL_1$, $RL_2$ are energized. The relay $RL_2$ has armatures (not shown in the drawing) by which the transmitter T is converted to an amplitude-modulation system regardless of the modulation system of the transceiver. As is apparent from the drawing, in normal transceiver operation, the relay $RL_1$ alone is activated by the press-to-talk button $K_1$. Therefore, in normal usage the modulation system is not altered since the relay $RL_2$ does not operate in that case.

It is also apparent from the description of FIG. 5 that it would be useful for the avoidance of miscalling anybody in the paging receiver a modulation system different from that of the transceiver used for calling up the paging receiver. The paging receiver can then never be called by another transceiver station with a different modulation system. The same object may be attained by adopting different decoder types at $D_0$ and $D_1$, respectively.

Figure 7:
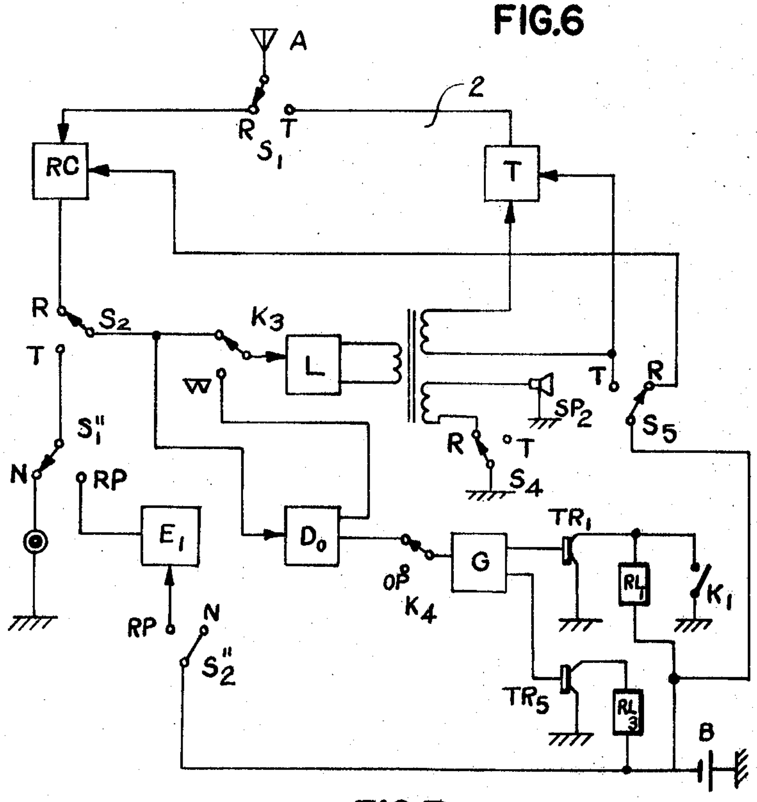
FIG. 7 is a block diagram of another embodiment of the invention in which automatic switching means is shown in detail.

FIG. 7 shows a block diagram of another embodiment of the invention in which a second relay $RL_3$ with armature $S''_1$, $S''_2$ is employed to throw the multiple switch S' (FIG. 3) automatically into its repeater position RP. A transistor $TR_5$ energizes the relay $RL_3$ when the control circuit G operates. A switch $K_3$ is operable to place the transceiver in its waiting state W wherein the output of the decoder is connected to the low-frequency amplifier L and the transceiver 2 becomes a conventional squelch system. With switch contact $K_3$ thus applying the output of decoder $D_0$ directly to the input of amplifier L for delivery to speaker $SP_2$, a circuit breaker $K_4$ having an open-circuit position OP may be employed to disconnect the control circuit G from the decoder $D_0$. Explanations about the other parts of this circuit are omitted since they are the same as those hereinbefore described with reference to FIG. 3.

With the switch positions as shown in FIG. 7, when the receiver RC receives a wave modulated by the output of encoder $E_0$ in the transmitter $T_0$, the decoder $D_0$ correspondingly provides an output and the control circuit G becomes operative to activate the relays $RL_1$ and $RL_3$. Thus, the armatures $S''_1$, $S''_2$ are swung into position RP and at the same time the armatures $S_1$, $S_2$, $S_4$ and $S_5$ are reversed to occupy the position T shown in the drawing. The encoder $E_1$ then provides an output by which the transmitter T is modulated.

Figure 8:
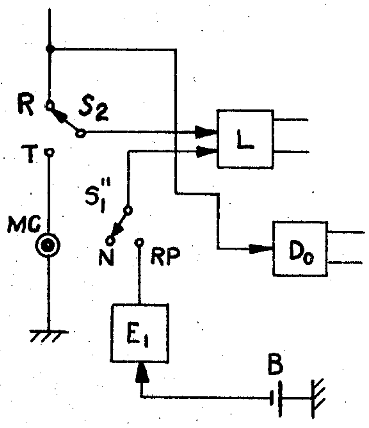
Figure 9:
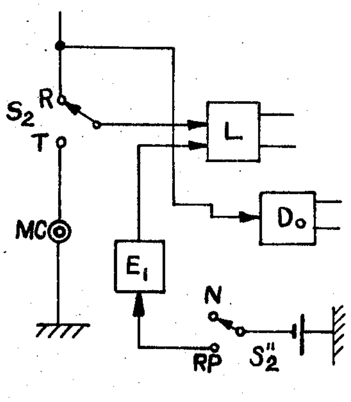

There are shown some alternate arrangements for the armatures of the relay $RL_3$. In each case a circuit related only to these armatures is shown and other parts are not indicated since they are the same as those shown in FIG. 7. In FIG. 8, the encoder $E_1$ is always operative and when the relay $RL_3$ is activated and its armature occupies its position RP, an output of encoder $E_1$ is supplied through that armature to the low-frequency amplifier L which acts as a modulator for the transmitter T. In FIG. 9 an output of encoder $E_1$ is normally connected to the low-frequency amplifier L and the encoder becomes operative when the relay $RL_3$ is activated and its armature S2'' swings into its position RP. In FIG. 10, a power source B is normally connected to the encoder $E_1$ and the control circuit G works into a switching transistor $TR_4$ by which the encoder $E_1$ is rendered operative to provide an output to the low-frequency amplifier L when control circuit G becomes operative and transistor $TR_4$ is activated thereby.

Figure 11:
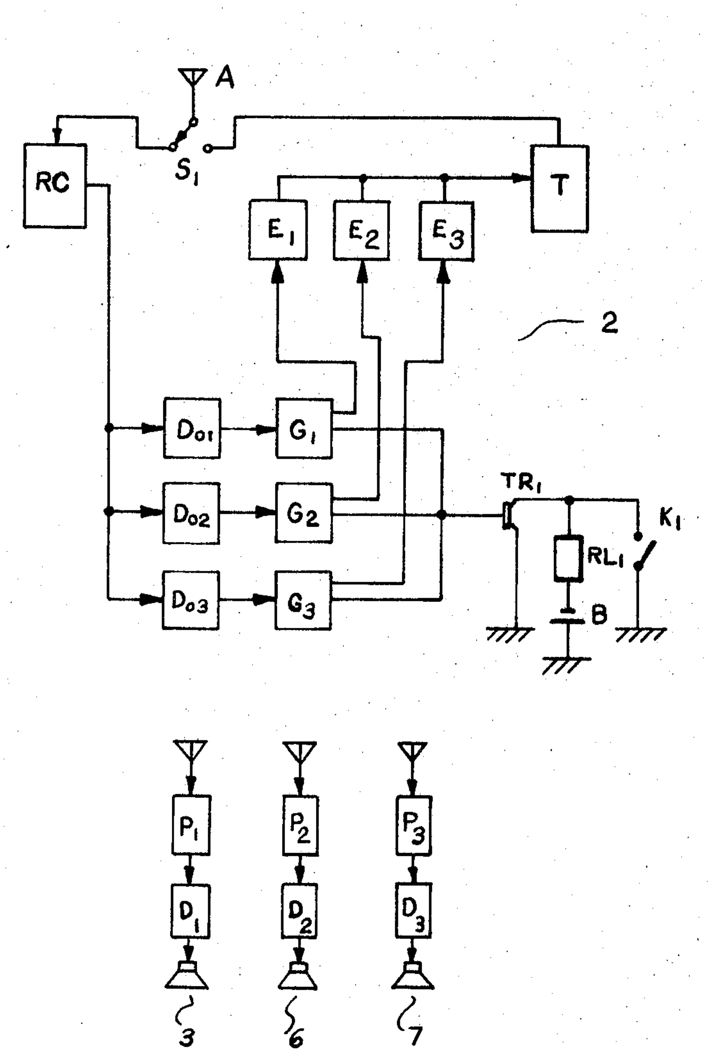
FIG. 11 is a block diagram of another embodiment of the invention with several paging receivers.

FIG. 11 shows a schematic diagram of another embodiment of the invention in which $D_{01}$, $D_{02}$, are decoders with mutually different operating frequencies and $E_1$, $E_2$, $E_3$ are encoders assigned to the decoders $D_1$, $D_2$, $D_3$, respectively, in the paging receivers 3, 6, 7. The outputs of circuits $G_1$, $G_2$, $G_3$ are combined in parallel and applied to the base of the transistor $TR_1$.

Therefore, if the receiver RC receives a calling signal corresponding to decoder $D_{01}$, the control circuit $G_1$ provides an output by which the encoder $E_1$ and press-to-talk relay $RL_1$ simultaneously become operative. Thus, the transceiver 2 is converted into a transmitter by the relay $RL_1$ and transmits a wave modulated by the output of encoder $E_1$. The paging receiver 3 having the decoder $D_1$ corresponding to the encoder $E_1$ is then selectively called up.

It will be apparent from the above description that if a calling signal corresponding to decoder $D_{01}$ is transmitted from the transmitter $T_0$ depicted in FIG. 1, the paging receiver 3 is called up and if a calling signal corresponds to decoder $D_{03}$ is transmitted, then the paging receiver 7 will be selectively called up.

Figure 12:
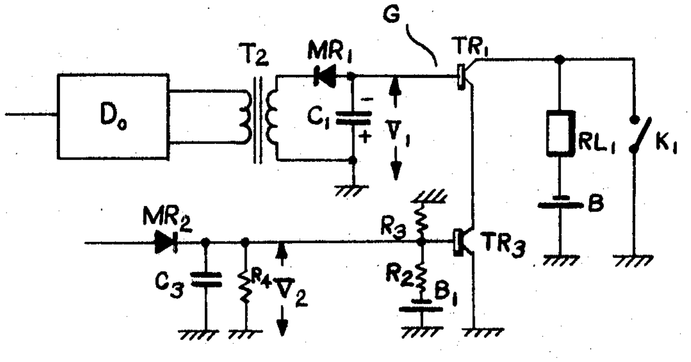
FIGS. 12, 13 and 14 are schematic diagrams of examples of circuits suitable for use as the control circuit.

A circuit suitable for use as the control circuit G, having functions as described hereinbefore, may be either a well known delay circuit, or a relay with a delay action, or a circuit of a conventional condenser-resistance combination. However, to facilitate a better understanding invention, some of the preferred types of control circuits have been schematically illustrated in the following figures. In FIG. 12 there is shown a special control circuit G which provides an output to render the switching transistor $TR_1$ conductive after the cessation of wave transmission (not just of the calling signal) from the calling transceiver $T_0$ depicted in FIG. 1. A transistor $TR_3$ is normally forwardly biased by a source $B_1$ of negative voltage in the usual manner by selecting appropriate values for resistances $R_2$ and $R_3$. When the receiver RC receives a carrier signal, this signal is detected by a rectifier $MR_2$ which monitors the receiver output to produce a positive voltage $V_2$. This renders the transistor $TR_3$ non-conductive by overcoming the original biasing voltage. Therefore, if a calling signal is received and the decoder $D_0$ has an output, rectifier $MR_1$ produces a negative voltage $V_1$ on condenser $C_1$. This negative voltage $V_1$ cannot flow through the base of the transistor $TR_1$ since the transistor $TR_3$ in the discharging path of the condenser $C_1$ is nonconductive.

When the calling signal and next the transmitted carrier wave from transmitter $T_0$ are terminated, the transistor $TR_3$ becomes conductive. The charge on condenser $C_1$ discharges through the path including: grounded emitter of transistor $TR_3$–collector of $TR_3$–emitter of $TR_1$–base of $TR_1$. The transistor $TR_1$ then becomes conductive to trip the relay $RL_1$.

The decoder described hereinbefore provides an output from sources of voices, speech signals and the like, but these outputs are usually of very short duration. In order to overcome this undesirable characteristic of the decoder, $D_0$, it is advantageous to store the energy from the decoder and to render the control circuit operative by such stored energy. This is because the stored energy is integrated and therefore proportional to the duration of the applied signal, and the duration of the calling signal can be made large.

Figure 13:
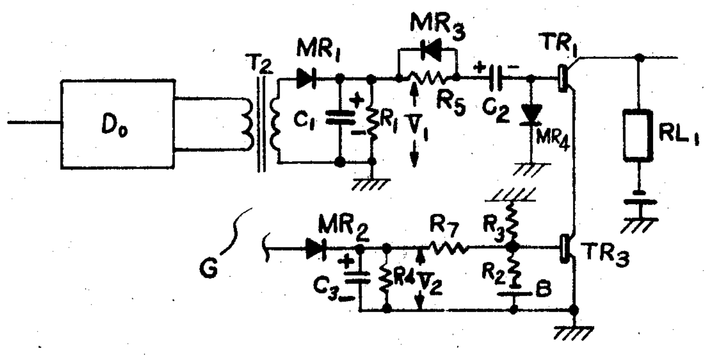

FIG. 13 shows another example of a circuit constructed along this principle and suitable for use as the control circuit G in the transceiver depicted in FIG. 1.

In this circuit the alternating-current voltage of the calling signal developed across the secondary winding of transformer $T_2$ is rectified by a diode $MR_1$ to produce the undirectional voltage $V_1$ for charging a capacitor $C_1$ with the polarity shown in the drawing and to provide a charge on a capacitor $C_2$ is also with the polarity shown. However, the charging current flows through a diode $MR_4$ in the forward direction thereof and does not flow through the base of transistor $TR_1$ since it is of a polarity opposite to that necessary to render transistor $TR_1$ conductive. The respective values of capacitor $C_1$ and resistor $R_1$ are so chosen that a relatively small time constant is attained and the respective values of capacitor $C_2$ and the associated resistors $R_1$ are chosen so that the time constant thereof is relatively large. Consequently, the charge on capacitor $C_1$ decays quite rapidly after the cessation of the input calling signal, but the condenser $C_2$ cannot discharge since transistor $TR_3$ is nonconductive. If the charging time constant of condenser $C_2$ is chosen sufficiently large as compared with the duration of the calling signal, a voltage stored on the condenser $C_2$ becomes proportional to the duration of the calling signal or to the energy derived from the decoder $D_0$. Thus the circuit shown in FIG. 13 is employed to improve the effectiveness of the decoder $D_0$.

When the carrier signal is terminated, as described in connection with FIG. 12, the rectified voltage $V_2$ decays and the transistor $TR_3$ reverts to its original state (i.e. becomes conductive).

Thus the condenser $C_2$ is discharged through the current path $MR_3$–$R_1$–$TR_3$–base of $TR_1$–$C_2$. The transistor $TR_1$ then becomes conductive to trip the relay $RL_1$. The discharging time constant is held to a very small value by making the resistance of the discharging path small. Thus, a surge current flows through the base of the transistor $TR_1$ to switch it. The diode $MR_4$ is employed to establish a charging path but prevents the flowing of discharging current through it. Diode $MR_3$ is employed to give a large resistive value for charging and a small value for discharge.

Figure 14:
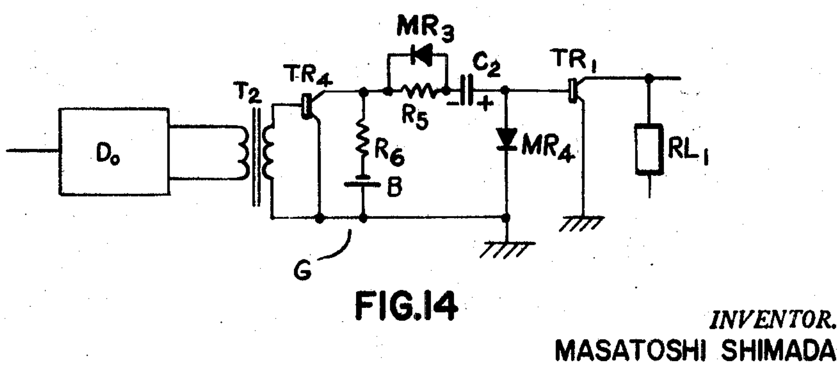

FIG. 14 shows another example of a circuit suitable for use as the control circuit G in the transceiver depicted in FIG. 1. In this circuit, the alternating-current voltage from the decoder $D_0$ is applied through transformer $T_2$ to the base of a transistor $TR_4$ and the transistor $TR_4$ becomes conductive. The condenser $C_2$ discharges through the path $MR_4$–$TR_4$–$R_5$ and the discharging time constant is substantially determined by the magnitudes of $C_2$, $R_5$.

When the alternating-current input voltage is terminated, the transistor $TR_4$ becomes non-conductive. Successively the condenser $C_2$ is charged by the source B through the charging path constituted by the emitter of $TR_1$, base of $TR_1$, $C_2$, $MR_3$, $R_6$ and this charging current flows through the base of transistor $TR_1$ to render it conductive and to trip the relay $RL_1$. The charging time constant is substantially decided by the value of $C_2$, $R_6$. The functions of diodes $MR_3$ and $MR_4$ are the same as described in connection with FIG. 13. It will be noted that the transistor $TR_1$ in FIG. 13 is rendered conductive by the discharging current of condenser $C_2$, but that in FIG. 14 the transistor $TR_1$ is rendered conductive by the charging current of condenser $C_2$.

What is claimed is:

1. In a radiocommunication system including a transmitter, a paging receiver, and a repeater adapted to relay a call signal from said transmitter to said paging receiver, the improvement wherein said repeater is part of a transceiver unit comprising:
- antenna means for intercepting incoming message signals and emitting outgoing message signals;
- receiving means and transmitting means provided with a common coupling circuit;
- a speaker connectable via said coupling circuit to the output of said receiver means;
- a microphone connectable via said coupling circuit to the input of said transmitter means;
- switchover means with a first and a second position for alternatively connecting said receiving means and said transmitting means to said antenna means with concurrent disconnection of said coupling circuit from said microphone and said speaker, respectively, said switchover means normally occupying said first position;
- manual actuating means for shifting said switchover means to said second position;
- decoding means connectable by said switchover means in said first position to said receiving means for responding to a call signal identifying said paging receiver;
- control means operable by an output from said decoding means for tripping said actuating means to shift said switchover means said second position with a delay sufficient to enable complete reception of said call signal; and
- encoding means connectable by said switchover means in said second position to said transmitting means for relaying said call signal to said paging receiver.

2. The improvement defined in claim 1, further comprising switch means independent of said switchover means operable to connect said encoding means in lieu of said microphone in circuit with said switchover means for connection thereby to said coupling circuit in said second position thereof.

3. The improvement defined in claim 2 wherein said paging receiver is removably positioned on said transmitter unit, said switch means being operative upon removal of said paging receiver from said unit.

4. The improvement defined in claim 2 wherein said decoding means is arranged to be connected by said switch means to said switchover means for connection thereby to said receiving means in said first position thereof.

5. The improvement defined in claim 2 wherein said transmitting means is provided with at least two sources of carrier frequencies, said sources being arranged for alternative connection to said transmitting means by said switch means in an unoperated and in an operated condition thereof, respectively.

6. The improvement defined in claim 1, further comprising contact means independent of said switchover means operable to connect the output of said decoding means in lieu of said receiving means to said coupling circuit for transmission of said call signal to said speaker.

7. The improvement defined in claim 6, comprising a circuit breaker for disconnecting the output of said decoding means from said control circuit.

8. The improvement defined in claim 1 wherein said control means includes a delay circuit with capacitive means for storing the output of said decoding means for a predetermined period.

9. The improvement defined in claim 8 wherein said delay circuit includes detector means monitoring the output of said receiving means for inhibiting the tripping of said actuating means in the presence of incoming wave energy.

10. The improvement defined in claim 8 wherein said capacitive means is part of an integrating circuit for producing a voltage proportional to the duration of said call signal.

11. In a radiocommunication system including a transmitter, a plurality of paging receivers, and a repeater adapted to relay respective call signals from said transmitter to respective paging receivers individually identified thereby, the improvement wherein said repeater is part of a transceiver unit comprising:
- antenna means for intercepting incoming message signals and emitting outgoing message signals;
- receiving means and transmitting means provided with a common coupling circuit;
- a speaker connectable via said coupling circuit to the output of said receiver means;
- a microphone connectable via said coupling circuit to the input of said transmitter means;
- switchover means with a first and a second position for alternatively connecting said receiving means and said transmitting means to said antenna means with concurrent disconnection of said coupling circuit from said microphone and said speaker, respectively, said switchover means normally occupying said first position;
- manual actuating means for shifting said switchover means to said second position;
- a plurality of decoders connectable by said switchover means in said first position to said receiving means for respectively responding to said call signals;
- a plurality of control units respectively operable by outputs from said decoders for tripping said actuating means to shift said switchover means to said second position with a delay sufficient to enable complete reception of an incoming call signal; and a plurality of encoders individually connectable by said switchover means in said second position to said transmitting means through the intermediary of said control unit for relaying said incoming call signal to the corresponding paging receiver.

References Cited

UNITED STATES PATENTS

| | | | |
|---|---|---|---|
| 2,442,815 | 6/1948 | Kelly | 325—5 X |
| 2,501,986 | 3/1950 | Brockman | 325—57 |
| 3,028,488 | 4/1962 | Hudspeth et al. | 325—7 |
| 3,065,421 | 11/1962 | Hart | 325—55 |
| 3,114,142 | 12/1963 | Bode et al. | 340—311 |
| 3,210,665 | 10/1965 | Street | 325—22 X |
| 3,366,880 | 1/1968 | Driver | 325—22 |
| 3,387,212 | 6/1968 | Kaufman | 325—1 |

ROBERT L. GRIFFIN, Primary Examiner

B. V. SAFOUREK, Assistant Examiner

U.S. Cl. X.R.

325—15, 22, 55